United States Patent
Xu et al.

(10) Patent No.: US 10,312,786 B2
(45) Date of Patent: Jun. 4, 2019

(54) LINEAR VIBRATING MOTOR WITH COIL BETWEEN A PLURALITY OF MAGNET MODULES AND MASS UNITS

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 197 days.

(21) Appl. No.: 15/011,497

(22) Filed: Jan. 30, 2016

(65) Prior Publication Data

US 2017/0019009 A1    Jan. 19, 2017

(30) Foreign Application Priority Data

Jul. 16, 2015   (CN) ..................... 2015 2 0518664 U

(51) Int. Cl.
| | | |
|---|---|---|
| *H02K 33/18* | (2006.01) | |
| *H02K 33/00* | (2006.01) | |
| *H02K 1/34* | (2006.01) | |
| *H02K 33/10* | (2006.01) | |
| *H02K 33/02* | (2006.01) | |
| *H02K 7/18* | (2006.01) | |

(52) U.S. Cl.
CPC .............. *H02K 33/18* (2013.01); *H02K 1/34* (2013.01); *H02K 33/00* (2013.01); *H02K 33/02* (2013.01); *H02K 33/10* (2013.01); *H02K 7/1876* (2013.01)

(58) Field of Classification Search
CPC ........ H02K 33/00; H02K 33/02; H02K 33/16; H02K 1/34; H02K 7/1876; H02K 33/04; H02K 33/06; H02K 33/08; H02K 33/10; H02K 33/12; H02K 33/14; H02K 33/18
USPC ......... 310/12.01, 12.14, 12.15, 12.16, 12.21, 310/12.22, 12.24, 12.25, 12.26, 12.27, 310/12.31, 12.32, 12.33
See application file for complete search history.

(56) References Cited

U.S. PATENT DOCUMENTS

| | | | |
|---|---|---|---|
| 2008/0265692 A1* | 10/2008 | Roberts | H02K 1/34 310/15 |
| 2010/0231060 A1* | 9/2010 | Bang | H02K 5/225 310/25 |
| 2011/0018364 A1* | 1/2011 | Kim | H02K 33/18 310/17 |

(Continued)

*Primary Examiner* — Bernard Rojas
*Assistant Examiner* — Alexander A Singh
(74) *Attorney, Agent, or Firm* — Na Xu; IPro, PLLC

(57) ABSTRACT

A linear vibrating motor is provided in the present disclosure. The linear vibrating motor includes a housing, a vibrator, a stator and an elastic part. The vibrator and the stator are received in the housing, the elastic part suspends the vibrator. The stator includes a coil and a coil support supporting the coil. The coil support includes a supporting plate, a pair of supporting arms and a pair of supporting legs. The supporting plate supports the coil, the pair of supporting arms extends from ends of the supporting plate respectively, and the pair of supporting legs extends from ends of the supporting arms respectively and is opposite to the supporting plate. The vibrator comprises a groove to receive the supporting plate, and the vibrator is partially positioned between the pair of supporting arms.

7 Claims, 3 Drawing Sheets

(56) References Cited

U.S. PATENT DOCUMENTS

2011/0018365 A1* 1/2011 Kim ................. B06B 1/045
                                              310/17
2013/0229070 A1* 9/2013 Akanuma .......... H02K 33/00
                                              310/25

* cited by examiner

LINEAR VIBRATING MOTOR WITH COIL BETWEEN A PLURALITY OF MAGNET MODULES AND MASS UNITS

FIELD OF THE DISCLOSURE

The present disclosure generally relates to vibrating motor technologies, and more particularly, to a linear vibrating motor for providing vibration feedback.

BACKGROUND

Vibrating motors are widely used in mobile devices such as mobile phones, tablet computer, handheld game players, personal digital assistant, or the like, for providing vibration feedback. In operation, the vibrating motors transform electrical energy into mechanical energy based on electromagnetic induction.

Generally, the vibrating motors can be categorized into two types: rotary vibrating motors and linear vibrating motors. The rotary vibrating motor generates vibration by driving an unbalanced rotor to rotate. The linear vibrating motor generates vibration by providing an electromagnetic force to drive a vibrator to perform linear mechanical vibration.

A typical linear vibrating motor includes a housing, a vibrator and a stator received in the housing, an elastic part for suspending the vibrator in the housing and a circuit system. The stator includes a coil and a coil support for supporting the coil, and the coil is electrically connected to the circuit system. The vibrator includes a mass unit and a magnet module. The magnet module is received in the mass unit and suspended above the coil. When a current passing through the coil changes, an electromagnetic force is produced between the coil and the magnet module, and the magnet module is driven by the electromagnetic force to enable the mass unit to vibrate.

The linear vibrating motor with a small size is preferred when being applied in a mobile device. However, in the above-described linear vibrating motor, the coil support uses four supporting legs extending from a bottom thereof to fix the coil support in the housing. With this configuration, the coil support needs to occupy a large space within the linear vibrating motor. This does not meet the miniaturization requirement of the mobile device.

Therefore, it is desired to provide a linear vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
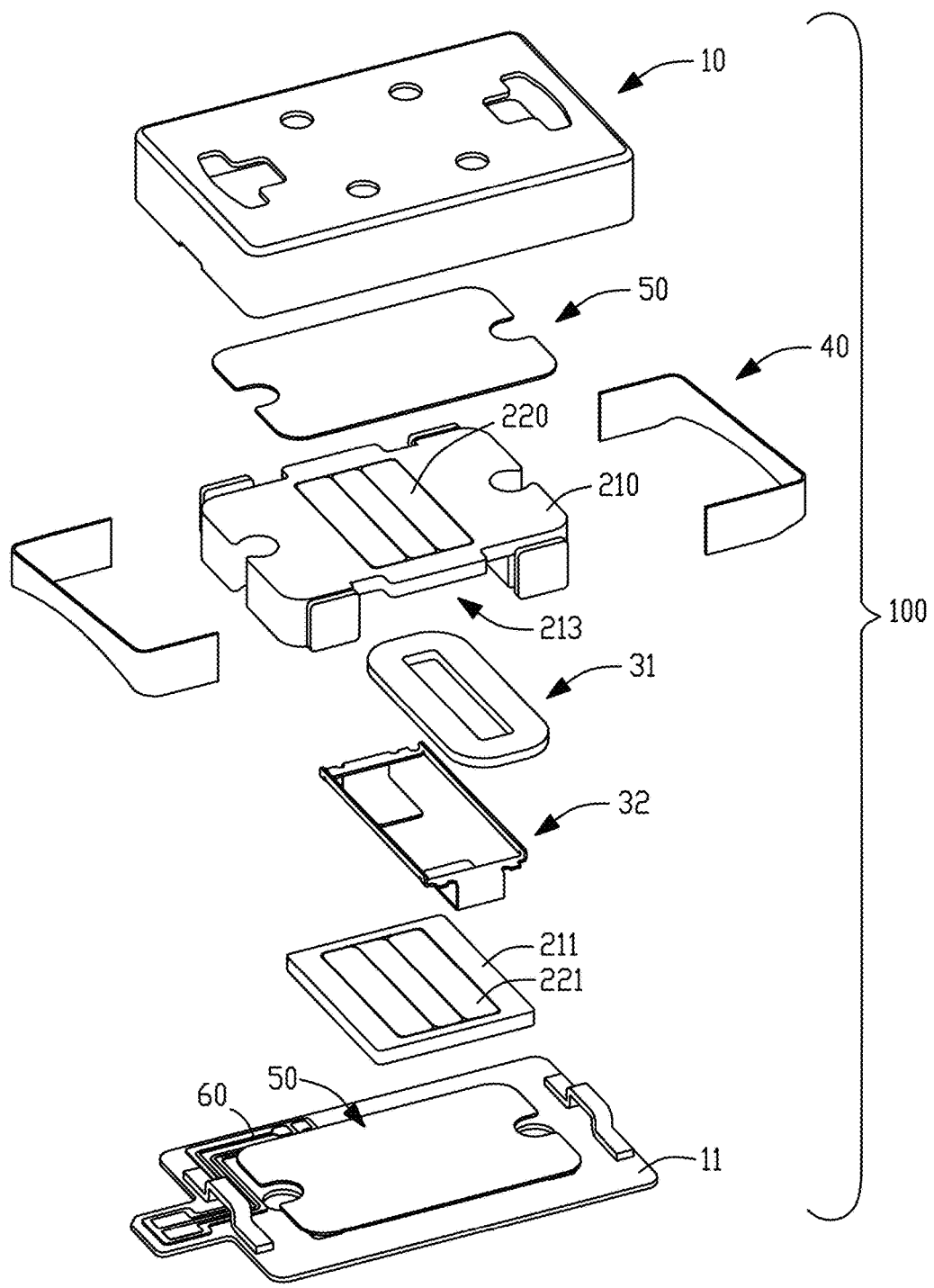
FIG. 1 is a schematic, exploded view of a linear vibrating motor according to an exemplary embodiment of the present disclosure.
Figure 2:
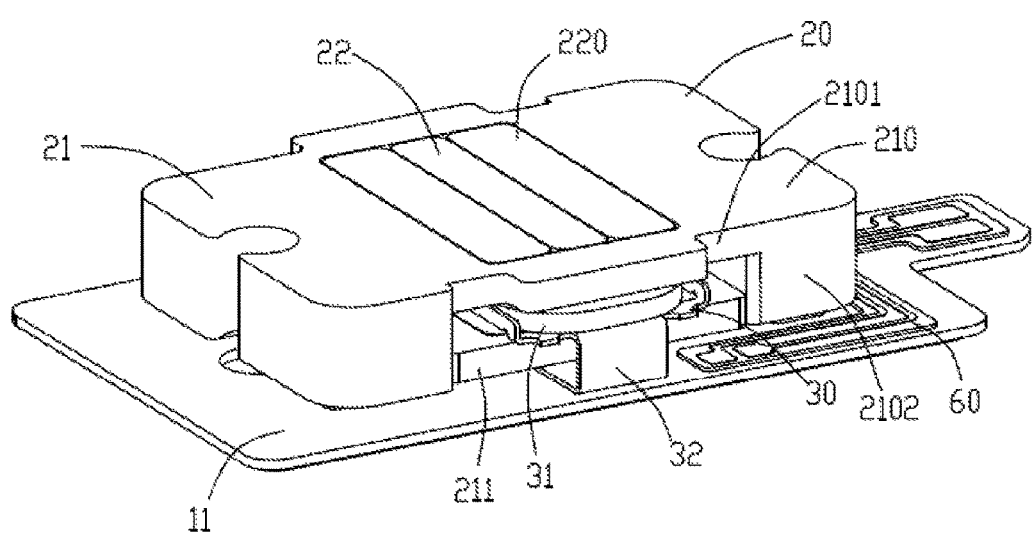
FIG. 2 is a partial, assembled view of the vibrating motor in FIG. 1.

Referring to FIGS. 1-2, a linear vibrating motor 100 according to an exemplary embodiment of the present disclosure is shown. The linear vibrating motor 100 includes a housing 10, a vibrator 20, a stator 30, an elastic part 40 and a circuit system 60. The vibrator 20, the stator 30 and the elastic part 40 are received in the housing 10. The housing 10 includes a bottom plate 11, and the circuit system 60 is attached to the bottom plate 11. Additionally, the stator 30 is fixed to the bottom plate 11. The vibrator 20 is suspended in the housing 10 by the elastic part 40, and driven to vibrate along a direction parallel to the bottom plate 11.

The vibrator 20 includes a mass unit 21, a magnet module 22 received in the mass unit 21, and a pair of pole plates 50 attached to the mass unit 21. The stator 30 includes a coil 31 and a coil support 32 for supporting the coil 31. The coil 31 is fixed to the bottom plate 11 via the coil support 32, and opposite to the magnet module 22 at a certain distance. Furthermore, the vibrator 20 may further include other components which are also driven to perform vibration in the linear vibrating motor 100 during operation.

Alternatively, roles of the coil 31 and the magnet module 22 can be reversed. For example, the coil 31 may be used as the vibrator 20; the magnet module 22 may be used as the stator 30 and fixed onto the bottom plate 11 of the housing 10. Additionally, both the mass unit 21 and the pole plates 50 are optional elements and therefore may be omitted.

Figure 3:
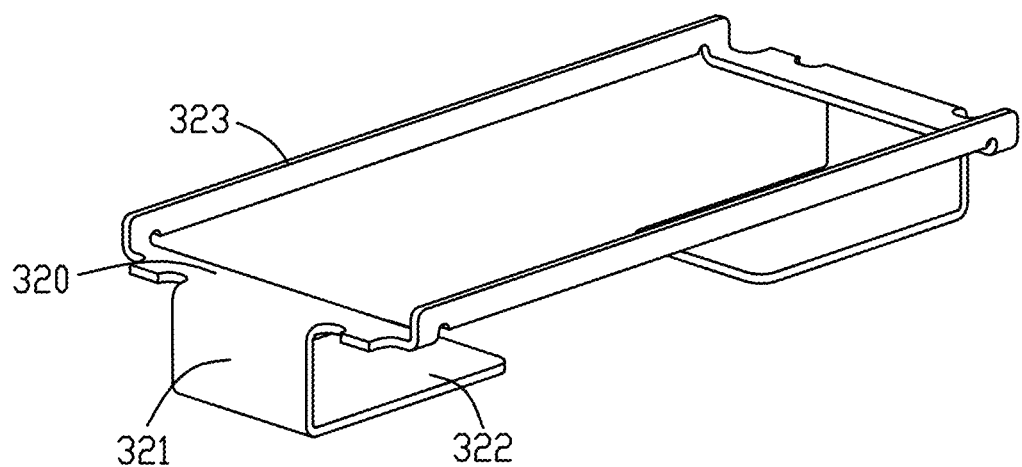
FIG. 3 is a schematic view of a coil support of the linear vibrating motor in FIG. 1.

In the present embodiment, referring to FIG. 3, the coil support 32 includes a supporting plate 320, a pair of supporting arms 321 and a pair of supporting legs 322. The supporting plate 320 supports the coil 31, the pair of supporting arms 321 perpendicularly extend from two opposite ends of the supporting plate 320, and the pair of supporting legs 322 perpendicularly extends from ends of the supporting arms 321 respectively. The supporting legs 322 are below the supporting plate 320 and parallel to the supporting plate 320.

The coil support 32 is fixed onto the bottom plate 11 of the housing 10 via the supporting legs 322. To firmly support the supporting plate 320 and fix the supporting legs 322 onto the bottom plate 11, the supporting legs 322 may have a same width as the supporting plate 320. Moreover, a pair of blocking plates 323 extends perpendicularly from two opposite sides of the supporting plate 320 in a direction away from the supporting arms 321, and the coil 31 supported by the supporting plate 320 is located between the pair of the blocking plates 323.

The mass unit 21 includes a first mass member 210 and a second mass member 211 opposite to the first mass member 210. The magnet module 22 includes a first magnet 220 received in the first mass member 210 and a second magnet 221 received in the second mass member 211. Moreover, the first mass member 210 includes a bottom 2101 and two sidewalls 2102 extending from two opposite sides of the bottom 2101, the bottom 2101 and the two sidewalls 2102 cooperatively form a groove 213. The second mass member 211 is received in the groove 213 and contacts against the two sidewalls 2102 of the first mass member 210. In particular, the second mass member 211 is spaced from the bottom 2101 of the first mass member 210. With this configuration, the first magnet 220 and the second magnet 221 are opposite to and keep a distance from each other.

In the present embodiment, the coil 31 is suspended between the first mass member 210 and the second mass member 211 by the coil support 32. Consequently, both the coil 21 and the supporting plate 320 are positioned in the vibrator 20, and disposed opposite to both the first magnet 220 and the second magnet 221 at a certain distance.

Moreover, the second mass member 211 is located in a space between the pair of the supporting arms 321 of the coil support 32. A distance between the pair of the supporting arms 321 is not less than a width of the second mass member 211; a height of the supporting arms 321 is not less than thickness of both the second mass member 211 and the second magnet 221.

In the present disclosure, the coil 31 supported by the coil support 32 is suspended in the mass unit 21, thus saving a space occupied by the coil 31 within the linear vibrating motor 100. Furthermore, the supporting legs 322 of the coil support 32 are located below the supporting plate 320; and the vibrator 20 is partially located between the pair of the supporting arms 321 of the supporting 32. With this configuration, an overall size of the linear vibrating motor 100 can be saved, and therefore the linear vibrating motor 100 is applicable to a mobile device with miniaturization requirement.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrating motor, comprising:
    a housing comprising a bottom plate;
    a vibrator received in the housing and vibrating along a vibration direction parallel to the bottom plate;
    a stator comprising a coil and a coil support for supporting the coil; and
    an elastic part for suspending the vibrator in the housing;
    wherein the vibrator comprises a first side surface extending along the vibration direction, a second side surface extending along the vibration direction and opposite to the first side surface, and a groove through the first side surface and the second side surface; the coil support which is received in the housing comprises a supporting plate received in the groove and supporting the coil disposed in the groove, a pair of supporting arms extending to the bottom plate from two opposite ends of the supporting plate and facing the first and second side surfaces of the vibrator respectively, and a pair of supporting legs extending from ends of the supporting arms respectively and fixed on the bottom plate, the pair of supporting legs is opposite to the supporting plate, the vibrator is partially positioned between the pair of the supporting arms.

2. The linear vibrating motor as described in claim 1, wherein the coil support further comprises a pair of blocking plates extending from the supporting plate in a direction away from the supporting arms, and the coil is located between the blocking plates.

3. The linear vibrating motor as described in claim 1, wherein the vibrator comprises a mass unit and a magnet module received in the mass unit.

4. The linear vibrating motor as described in claim 3, wherein the mass unit comprises a first mass member and a second mass member opposite to the first mass member, the first mass member comprises a bottom and two sidewalls extending from two opposite sides of the bottom, the bottom and the two sidewalls cooperatively form the groove, the second mass member is received in the groove and separated from the bottom, the magnet module comprises a first magnet received in the first mass member and a second magnet received in the second mass member, the first magnet and the second magnet are opposite to and keep a distance from each other, the coil is suspended between the first magnet and the second magnet by the coil support.

5. The linear vibrating motor as described in claim 4, wherein the second mass member is located between the pair of the supporting arms of the coil support.

6. The linear vibrating motor as described in claim 5, wherein a distance between the pair of the supporting arms of the supporting plate is not less than a width of the second mass member, and a height of the supporting arms is not less than thickness of both the second mass member and the second magnet.

7. The linear vibrating motor as described in claim 1, wherein the supporting legs have a same width as the supporting plate.

* * * * *